(12) United States Patent
Gonikberg

(10) Patent No.: US 8,130,659 B2
(45) Date of Patent: Mar. 6, 2012

(54) RF TRANSCEIVER SYSTEM WITH ADJUSTABLE TRANSMISSION PARAMETERS AND METHODS FOR USE THEREWITH

(75) Inventor: Mark Gonikberg, Los Altos Hills, CA (US)

(73) Assignee: Broadcom Corporation, Irvine, CA (US)

( * ) Notice: Subject to any disclaimer, the term of this patent is extended or adjusted under 35 U.S.C. 154(b) by 377 days.

(21) Appl. No.: 11/731,239

(22) Filed: Mar. 29, 2007

(65) Prior Publication Data

US 2008/0238629 A1    Oct. 2, 2008

(51) Int. Cl.
*H04L 1/00* (2006.01)
(52) U.S. Cl. ........................................ 370/242; 370/252
(58) Field of Classification Search .................. 370/229, 370/230, 241–252, 311, 328, 338
See application file for complete search history.

(56) References Cited

U.S. PATENT DOCUMENTS

| | | | |
|---|---|---|---|
| 6,456,858 B1 * | 9/2002 | Streter | 455/552.1 |
| 6,587,686 B1 * | 7/2003 | Cuffaro et al. | 455/423 |
| 2002/0080735 A1 * | 6/2002 | Heath et al. | 370/328 |
| 2003/0117956 A1 * | 6/2003 | Lee | 370/232 |
| 2005/0111371 A1 * | 5/2005 | Miura et al. | 370/242 |
| 2005/0232147 A1 * | 10/2005 | Bang et al. | 370/229 |
| 2006/0120336 A1 * | 6/2006 | Fantaske | 370/338 |
| 2006/0182147 A1 * | 8/2006 | Sanchez | 370/503 |
| 2007/0030821 A1 * | 2/2007 | Iwamura et al. | 370/328 |
| 2007/0147316 A1 * | 6/2007 | Khan et al. | 370/338 |
| 2008/0175211 A1 * | 7/2008 | Hansen et al. | 370/338 |

* cited by examiner

*Primary Examiner* — Ricky Ngo
*Assistant Examiner* — Wei-Po Kao
(74) *Attorney, Agent, or Firm* — Garlick Harrison & Markison; Bruce E. Stuckman

(57) ABSTRACT

A circuit includes a transceiver coupled to transmit an outbound signal in accordance with a plurality of transmit parameters to at least one remote station and receive an inbound signal from the at least one remote station. The transceiver detects a packet transmission failure, selects one of a plurality of transmission failure causes, and adjusts at least one of a plurality of transmit parameters, based on the selected one of the plurality of transmission failure causes.

19 Claims, 8 Drawing Sheets

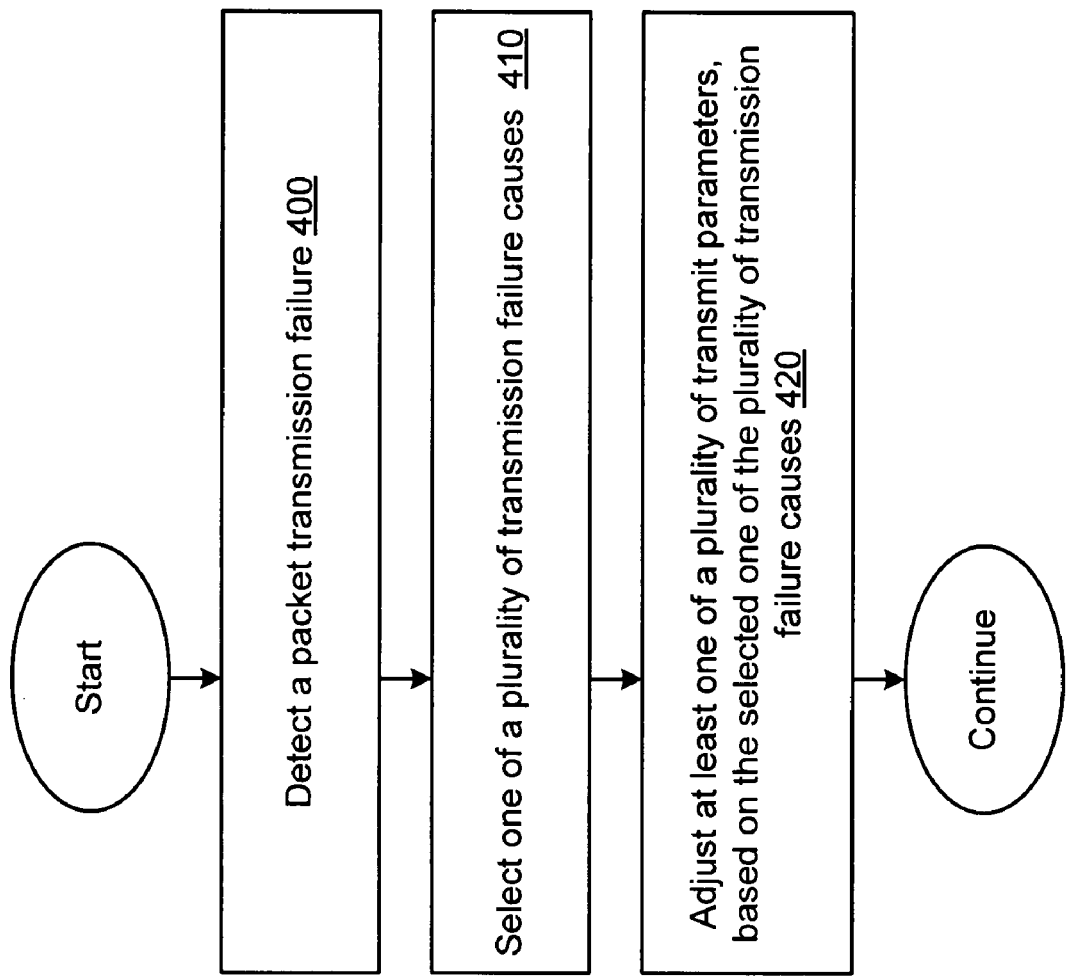

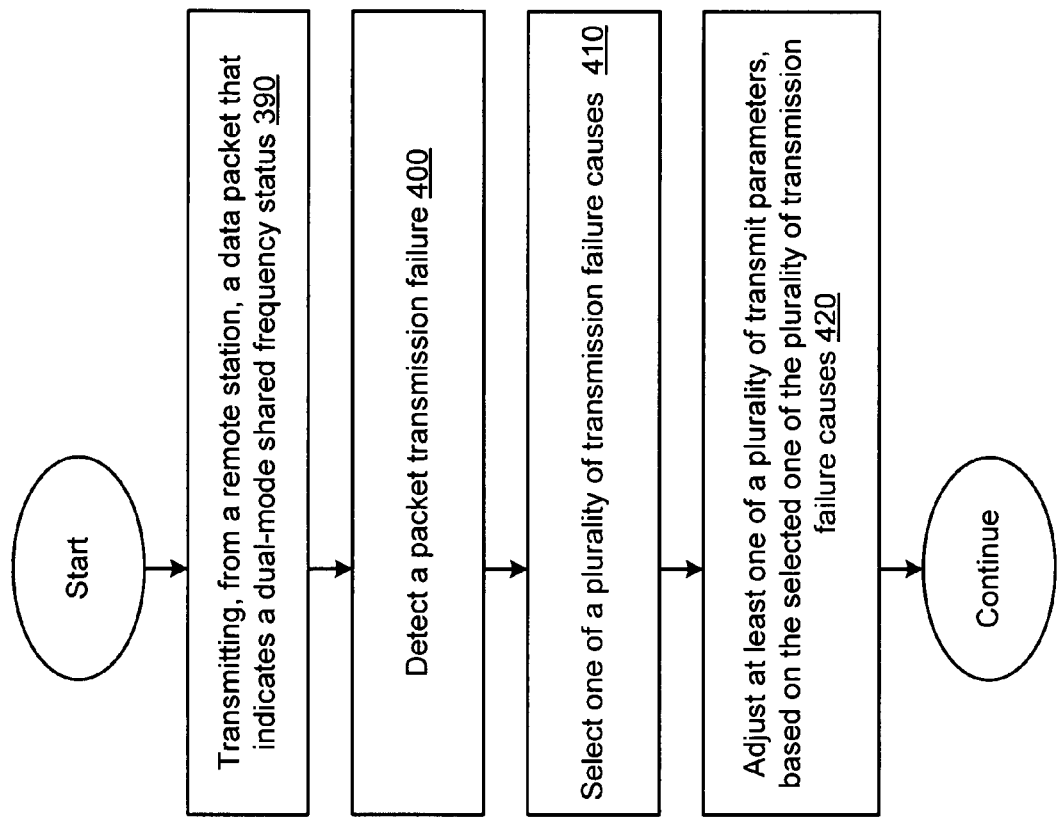

RF TRANSCEIVER SYSTEM WITH ADJUSTABLE TRANSMISSION PARAMETERS AND METHODS FOR USE THEREWITH

CROSS-REFERENCE TO RELATED APPLICATIONS

None

BACKGROUND OF THE INVENTION

1. Technical Field of the Invention

The present invention relates to data communications and in particular to improving performance of multiple network multiple protocol communication using a shared medium.

2. Description of the Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11b, IEEE 802.11g, IEEE 802.11a, Bluetooth, IEEE 802.16e, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof. Wireless communication devices exploit electromagnetic wave propagation to transmit data. Such communication devices include a radio receiver and/or a radio transmitter.

The radio transmitter usually includes a data modulation stage, one or more frequency conversion stages, and a power amplifier coupled to the antenna. The data modulation stage converts (modulates) raw data bits into baseband signal in accordance with a particular wireless communication standard. The frequency conversion stages convert baseband signal into a radio frequency (RF) signal. The power amplifier amplifies the RF signal and an antenna radiates RF signal as an electromagnetic field.

The radio receiver is coupled to an antenna and usually includes low noise amplifier, one or more frequency conversion stages, one or more filtering stages and a data recovery stage. The antenna converts electromagnetic field into an electrical RF signal, the low noise amplifier amplifies the electrical RF signal, the frequency conversion stages convert RF signal into a baseband signal, the filtering stages attenuate all unwanted frequency components and the data recovery stage recovers (demodulates) raw data from the filtered signal in accordance with a particular communication standard.

The electromagnetic field radiated at the receive antenna is inversely proportional to the distance from the transmit antenna. The electrical RF signal produced by the antenna is coupled with the noise signal caused by the random thermal motion of the electrons. This noise may cause errors in the data recovery process. The probability of such error depends on the signal to noise ratio (SNR) and the type of modulation used in the data transmission. The higher the SNR ratio, the lower the probability of the bit error. The reliability of the wireless link is often measured by the bit error rate (BER) or packet error rate (PER).

Wireless standards often allow transmitter to use more than one way to modulate the raw data. For example wireless communication devices that are compliant with 802.11g standard can communicate with each other using data rates of 1, 2, 5.5, 6, 9, 11, 12, 18, 24, 36, 48 and/or 54 Mbps (megabits per second). Usually the higher the data rate the higher the SNR needed to achieve equivalent BER or PER.

To maintain a reliable data connection at the highest possible data rate the transmitter usually employs a dynamic transmission adaptation algorithm. Such algorithm usually reduces the data rate for wireless communication when number of unsuccessful attempts to transmit the packet reaches a certain threshold. In an environment where the thermal noise is the only source of demodulating errors this algorithm converges to the highest data rate supported by the wireless link.

As is known, differing standards sometimes use the same communication medium (e.g., allocated radio frequency spectrum, wired connections, etc.) due to a finite amount of communication medium. For example, both Bluetooth and IEEE 802.11g use the 2.4 GHz spectrum. As long as communication systems that are compliant with differing standards that share a communication medium do not physically overlap, the systems operate without interference from each other. However, if the communication systems do physically overlap, they might interfere with each other, degrading the performance of both systems. For example, if a Bluetooth piconet physically overlaps with an IEEE 802.11b local area network, simultaneous use of the 2.4 GHz spectrum might cause interference that can cause both transmissions to fail.

Further a single device can be capable of operating in two modes (e.g. Bluetooth and WLAN or WLAN & WiMax) such that operation of the device in one mode could preclude simultaneous operation in the other mode, particularly if one or more shared circuit components are used to implement these two modes of operation. For instance, if the device is operating in a Bluetooth mode, 802.11g transmissions directed to the device could fail and vice versa.

For transmission with the same amount of data, the probability of the overlapping medium use is higher for lower data rates as such packets require longer time to transmit. For the cases where transmission failed due to the interference from another network using the same medium or due to transmissions directed to a multimode device that uses shared circuit components, the regular dynamic transmission adaptation algorithm employed by the transmitter results in lowering the data rate, increasing the packet transmission time thus further increasing the probability of the medium access collisions. Other disadvantages of the prior art will be apparent to one skilled in the art when presented the disclosure herein.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 1 presents a pictorial representation of a wireless network 111 in accordance with an embodiment of the present invention.

FIG. 7 is a flowchart representation of a method in accordance with an embodiment of the present invention.

FIG. 8 is a flowchart representation of a method in accordance with an embodiment of the present invention.

DETAILED DESCRIPTION OF THE INVENTION

Figure 1:
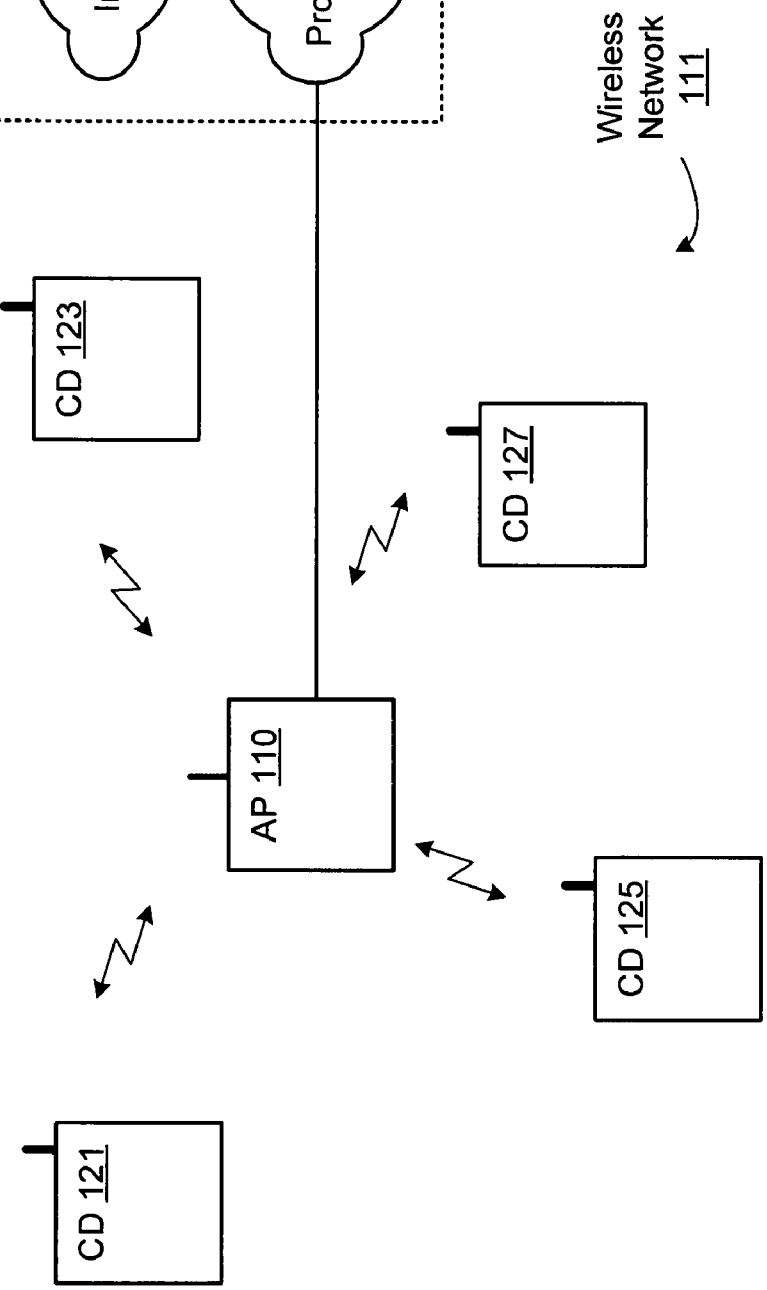

FIG. 1 presents a pictorial representation of a wireless network 111 in accordance with an embodiment of the present invention. The wireless network 111 includes an access point 110 that is coupled to packet switched backbone network 101. The access point 110 manages communication flow over the wireless network 111 destined for and originating from each of communication devices 121, 123, 125 and 127. Via the access point 110, each of the communication devices 121, 123, 125 and 127 can access service provider network 105 and Internet 103 to, for example, surf web-sites, download audio and/or video programming, send and receive messages such as text messages, voice message and multimedia messages, access broadcast, stored or streaming audio, video or other multimedia content, play games, send and receive telephone calls, and perform any other activities, provided directly by access point 110 or indirectly through packet switched backbone network 101.

Access point 110 communicates real-time data and/or non-real-time data wirelessly with communication devices 121, 123, 125 and 127 over wireless network 111. In an embodiment of the present invention, one or more of the communication devices 121, 123, 125 and 127 are multimode shared frequency devices. In particular, the wireless network 111 operates with a first wireless communication path that shares a common frequency spectrum with a second wireless communication path used by one or more of the communication devices 121, 123, 125 and 127 when operating in an alternative communication mode, and further, these devices operate with shared circuit components or other limitations that otherwise preclude the operation of these devices in both communication modes simultaneously. The first and second wireless communication paths can operate in accordance with wireless network protocols such as IEEE 802.11, Bluetooth, Ultra-Wideband (UWB), WIMAX, or other wireless network protocols, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary.

In an embodiment of the present invention, the communication devices 121, 123, 125 and 127 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications. In operation, the communication devices include one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data can include voice, audio, video and multimedia applications including Internet gaming, etc. The non-real-time data can include text messaging, email, web browsing, file uploading and downloading, etc.

In an embodiment of the present invention, the access point 110 and/or the communication devices include an integrated circuit, such as a combined voice, data and RF integrated circuit or other integrated circuit that will be described in greater detail in association with FIGS. 2 and 3 that follow. These integrated circuits include an adaptive RF transceiver that is operable to detect a packet transmission failure, to select one of a plurality of transmission failure causes, and to adjust at least one of a plurality of transmit parameters, based on the selected one of the plurality of transmission failure causes. In this fashion, the RF transceiver can operate with a first set of transmit parameters and/or a first rate adjustment schedule when the RF transceiver detects that transmission failures are caused by a standard noise environment, such as a additive white Gaussian noise (AWGN) environment. However, when the RF transceiver detects other conditions such as burst noise or transmission failures caused by the receiving station being non-responsive, such as in the case that the receiving station is a multi-mode shared frequency device that operates in different modes in a shared frequency band (such a 802.11 compliant wireless local area network mode and a Bluetooth mode or other shared frequency modes, etc.) and is currently operating in a different mode than the transmitting station. In these cases, other transmit parameters and/or other rate adjustment schedules can be implemented that are better suited for efficient throughput under these alternative conditions. Further details including many optional functions and features of the invention will be described in greater detail in association with FIGS. 2-8 that follow.

Figure 2:
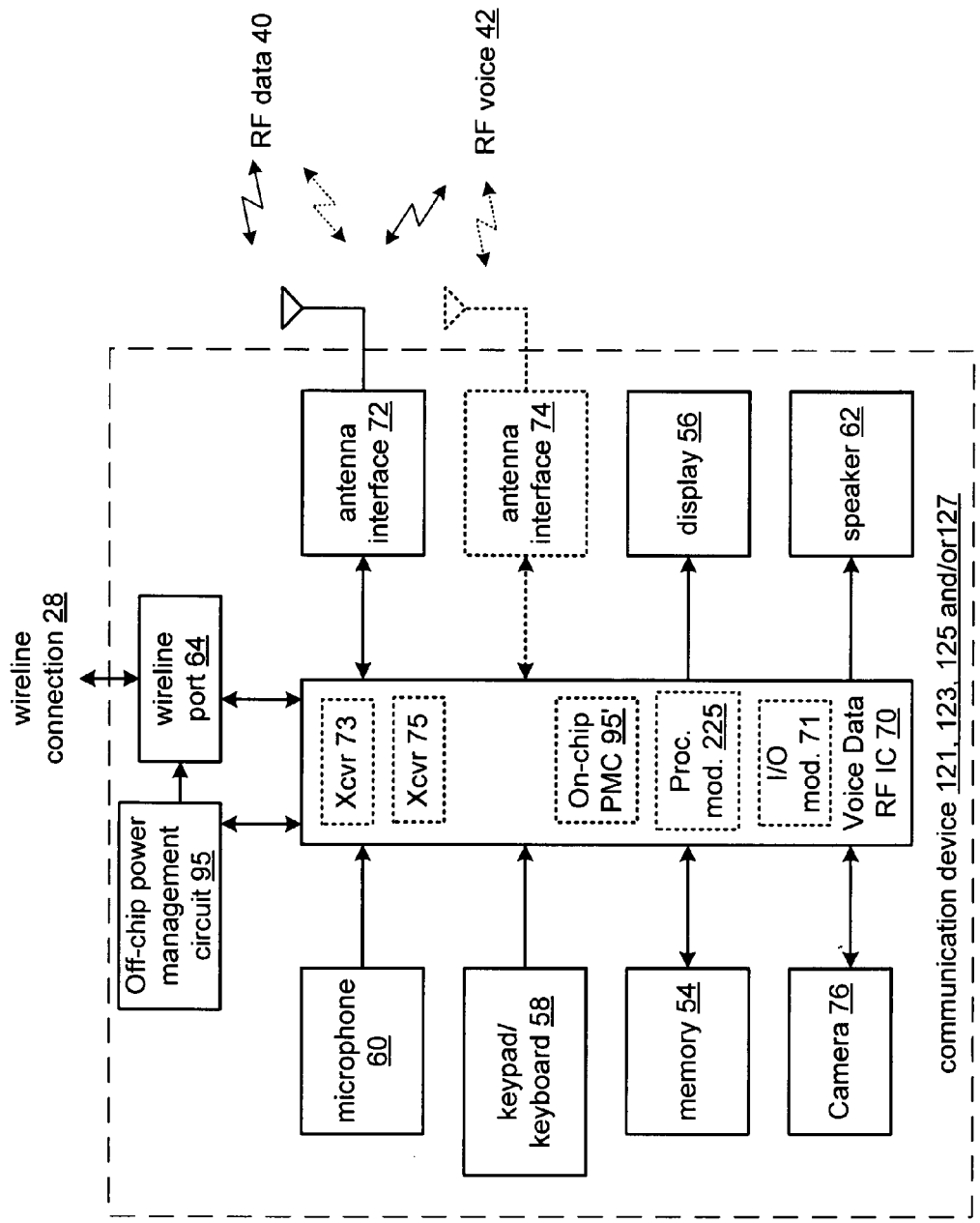
FIG. 2 is a schematic block diagram of a wireless communication device 121, 123, 125 or 127 in accordance with the present invention.

FIG. 2 is a schematic block diagram of an embodiment of an integrated circuit in accordance with the present invention. In particular, an RF integrated circuit (IC) 70 is shown that implements communication device 121, 123, 125 and/or 127 in conjunction with microphone 60, keypad/keyboard 58, memory 54, speaker 62, display 56, camera 76, antenna interface 52 and wireline port 64. In addition, voice data RF IC 70 includes transceivers 73 and 75 with RF and baseband modules for formatting and modulating data into RF real-time data and/or non-real-time data and transmitting this data and receiving similarly formatted data via an antenna interfaces 72 and 74 and attached antennas. While shown as separate components, transceivers 73 and 75, and antenna interfaces 72 and 74 may be optionally implemented with a single transceiver, and antenna interface attached to a single antenna, particularly where the RF data 40 and RF voice 42 operate over a shared frequency band. Further, these modules may be implemented with partly dedicated and partly shared components to operate more efficiently.

Further, communication device 121, 123, 125 and/or 127 can be a multi-mode shared frequency device that operates in different modes in a shared frequency band. For instance, transceiver 73 may operate itself in two or more modes of operation, such as in a Bluetooth and WLAN mode over a shared frequency spectrum. In addition, transceiver 75 may operate in GSM, UMTS, EDGE modes in another shared frequency spectrum.

RF IC 70 further includes an input/output module 71 with appropriate encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Off-chip power management circuit 95 includes one or more DC-DC converters, voltage regulators, current regulators or other power supplies for supplying the RF IC 70 and optionally the other components of communication device 10 and/or its peripheral devices with supply voltages and or currents (collectively power supply signals) that may be required to power these devices. Off-chip power management circuit 95 can operate from one or more batteries, line power and/or from other power sources, not shown. In particular, off-chip power management module can selectively supply power supply signals of different voltages, currents or current limits or with adjustable voltages, currents or current limits in response to power mode signals received from the RF IC 70. RF IC 70 optionally includes an on-chip power management circuit 95' for replacing the off-chip power management circuit 95.

In an embodiment of the present invention, the RF IC 70 is a system on a chip integrated circuit that includes at least one processing device. Such a processing device, for instance, processing module 225, may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the RF IC 70 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In operation, the RF IC 70 executes operational instructions that implement one or more of the applications (real-time or non-real-time) attributed to communication devices 121, 123, 125, and/or 127 as discussed in conjunction with FIG. 1.

Figure 3:
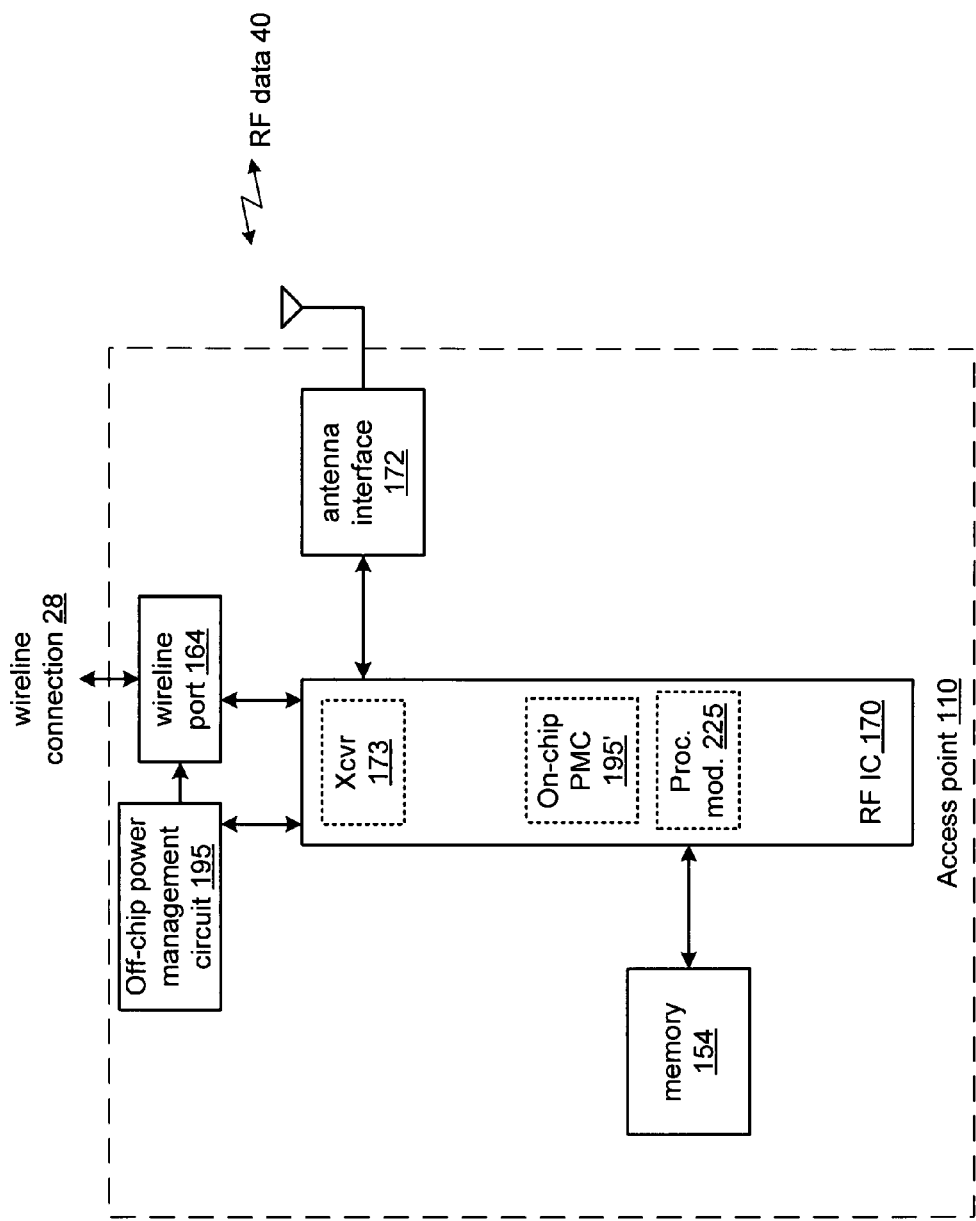
FIG. 3 is a schematic block diagram of a wireless access point 110 in accordance with the present invention.

FIG. 3 is a schematic block diagram of an embodiment of an integrated circuit in accordance with the present invention. In particular, an IC is shown that is used to implement access point 110. RF integrated circuit (IC) 170 operates in conjunction with memory 154, antenna interface 172 and wireline port 164 to implement the functions and features attributed to access point 110 as discussed in conjunction with FIG. 1. In addition, RF IC 170 includes transceiver 173 with RF and baseband modules for formatting and modulating data into RF data 40 and transmitting this data and receiving similarly formatted data via an antenna interfaces 172 the attached antenna. While not shown, access point 110 optionally includes other modules such as microphone 60, keypad/keyboard 58, speaker 62, display 56, camera 76, of communication devices 121, 123, 125 or 127 along with one or more interface modules and/or other modules depending on the type of device, the form factor, etc.

Further, access point 110 can itself be a multi-mode device that operates in different modes in a shared frequency band. For instance, transceiver 173 can operate in two or more modes of operation, such as in a Bluetooth and WLAN mode over a shared frequency spectrum Also, transceiver 173 can operate in adaptive fashion to detect a packet transmission failure, to select one of a plurality of transmission failure causes, and to adjust at least one of a plurality of transmit parameters, based on the selected one of the plurality of transmission failure causes.

Off-chip power management circuit 195 includes one or more DC-DC converters, voltage regulators, current regulators or other power supplies for supplying the RF IC 170 and optionally the other components of access point 110 and/or its peripheral devices with supply voltages and or currents (collectively power supply signals) that may be required to power these devices. Off-chip power management circuit 195 can operate from one or more batteries, line power and/or from other power sources, not shown. In particular, off-chip power management module can selectively supply power supply signals of different voltages, currents or current limits or with adjustable voltages, currents or current limits in response to power mode signals received from the RF IC 170. RF IC 170 optionally includes an on-chip power management circuit 195' for replacing the off-chip power management circuit 195.

In an embodiment of the present invention, the RF IC 170 is a system on a chip integrated circuit that includes at least one processing device, such as processing module 225 described in conjunction with FIG. 2.

Figure 4:
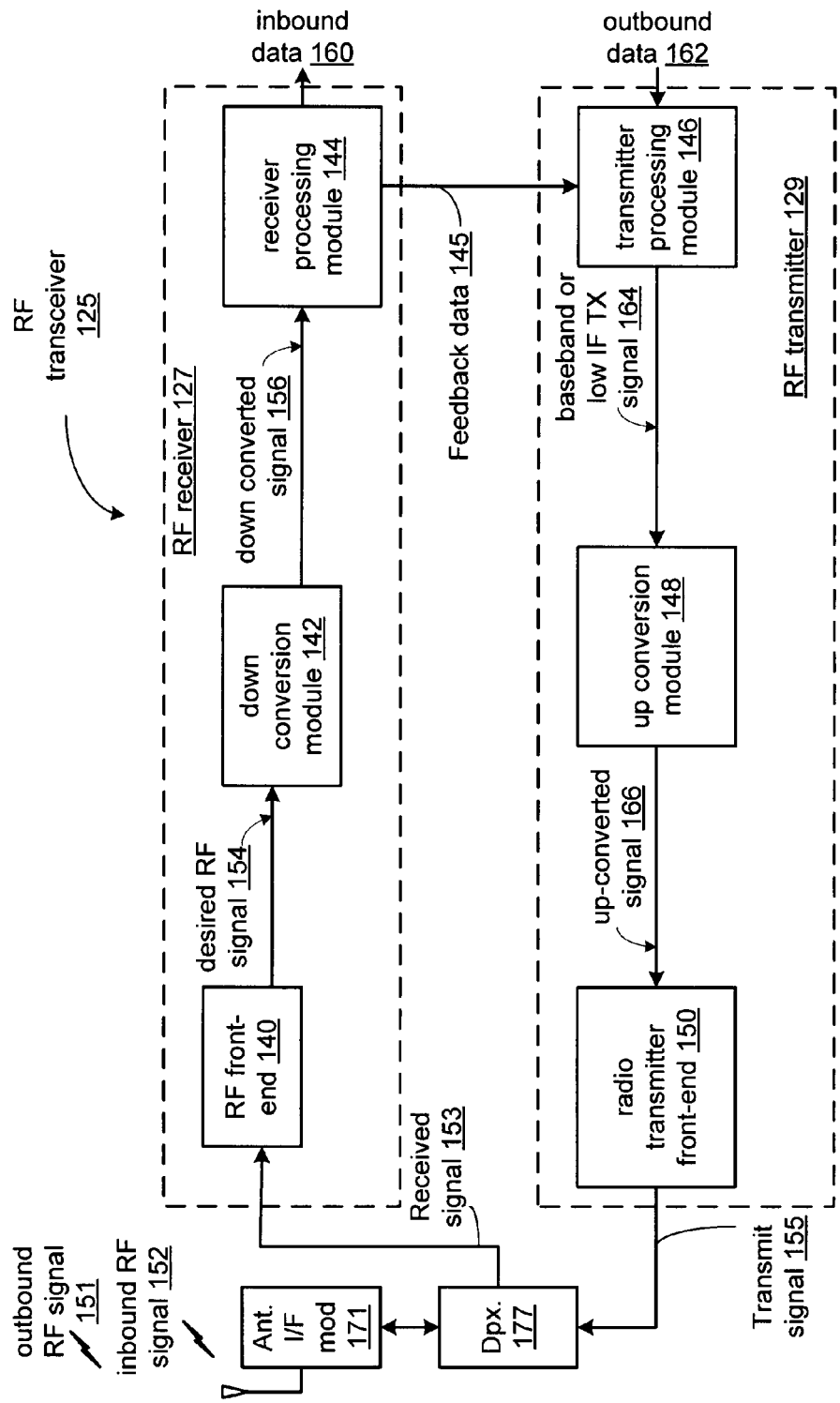
FIG. 4 is a schematic block diagram of an RF transceiver 125 in accordance with the present invention.

FIG. 4 is a schematic block diagram of an RF transceiver 125, such as transceivers 73, 75 and/or 173, which may be incorporated in communication devices 121, 123, 125, 127 and/or access point 110. The RF transceiver 125 includes an RF transmitter 129, and an RF receiver 127. The RF receiver 127 includes a RF front end 140, a down conversion module 142, and a receiver processing module 144. The RF transmitter 129 includes a transmitter processing module 146, an up conversion module 148, and a radio transmitter front-end 150.

As shown, the receiver and transmitter are each coupled to an antenna through an off-chip antenna interface 171 and a diplexer (duplexer) 177, that couples the transmit signal 155 to the antenna to produce outbound RF signal 151 and couples inbound signal 152 to produce received signal 153. While not shown, a transmit/receive switch can be implemented in place of diplexer 177. Further, while a single antenna is represented, the receiver and transmitter may each use separate antennas that each include one or more antennas. Each of the antennas may be fixed, programmable, and antenna array or other antenna configuration. Further, the antenna structure of the wireless transceiver may depend on the particular standard(s) to which the wireless transceiver is compliant and the applications thereof.

In operation, the transmitter receives outbound data 162 from a host device or other source via the transmitter processing module 146. The transmitter processing module 146 processes the outbound data 162 in accordance with a particular wireless communication standard (e.g., IEEE 802.11, Bluetooth, RFID, GSM, CDMA, et cetera) to produce baseband or low intermediate frequency (IF) transmit (TX) signals 164. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion. Further note that the transmitter processing module 146 may be implemented using a shared processing device, individual processing devices, or a plurality of processing devices and may further include memory. Such a processing device implements one or more of its functions via microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up converted signals 166 based on a transmitter local oscillation 168.

The radio transmitter front end 150 includes a power amplifier and may also include a transmit filter module. The power amplifier amplifies the up converted signals 166 to produce outbound RF signals 151, which may be filtered by the transmitter filter module, if included. The antenna structure transmits the outbound RF signals 151 to a targeted device such as a RF tag, base station, an access point and/or another wireless communication device.

The receiver receives inbound RF signals 152 via the antenna through off-chip antenna interface 171 that operates to process the inbound RF signal 152 into received signal 153 for the receiver front-end 140. The down conversion module 142 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 includes, but is not limited to, digital intermediate frequency to baseband conversion, demodulation, demapping, depuncturing, decoding, and/or descrambling. Note that the receiver processing modules 144 may be implemented using a shared processing device, individual processing devices, or a plurality of processing devices and may further include memory. Such a processing device can implement one or more of its functions via a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, receiver processing module 144 is operable to detect a packet transmission failure from a remote station, such as by determining that a packet transmitted by RF transceiver 125 was not acknowledged. Receiver processing module 144 provides feedback data 145 to transmitter processing module 146 that selects one of a plurality of transmission failure causes for the packet transmission failure, and adjusts at least one of a plurality of transmit parameters used to generate transmit signal 155, based on the selected one of the plurality of transmission failure causes. While shown as separate modules, receiver processing module 144 and transmitter processing module 146 can be implemented using a shared processor, such as processing module 225. As such the steps performed by receiver processing module 144 and transmitter processing module 146 can be shifted, to provide functionality of one device to the other, within the broad scope of the present invention.

In an embodiment of the present invention, the feedback data 145 includes a bit error rate, packet error rate, failure statistics such as a mean time between packet transmission failures, median time between packet transmission failures a variance in the time between packet transmission failures or other statistics, a distribution of packet transmission failures, timing profile of packet transmission failures, and/or other packet transmission failure parameters that indicate current and/or historical data relating to packet transmission failures. Feedback data can also include status feedback received from a remote station in communication with RF transceiver 125. Such status data can include battery status, power status, trouble status, a mode status that indicates that a particular remote station is a multi-mode shared frequency device that is capable of switching to an alternative mode or more specific mode status data that indicates a coming change or modes, a mode schedule or other data relating to mode changes.

Feedback data 145 can be aggregated for all remote stations that are in communication with RF transceiver 125. In the alternative, feedback data 145 can be determined separately for each remote station in communication with RF transceiver 125 so that RF transceiver 125 can optionally determine different packet transmission failure causes for packet transmission failures experienced in communications sent to different devices. For instance, a particular remote station may be subject to burst interference caused by a relatively low power interference source that is located close to this remote station but farther away from the RF transceiver 125 and the other remote stations in communication with the RF transceiver, while the operation of other remote stations may be governed predominately by AWGN. Further a remote station can be a multi-mode shared spectrum device that has switched modes and be effectively "dead" for a period of time with packet transmission failures occurring for all transmissions from RF transceiver 125 during this period, while the other remote stations in the area are operating normally.

The provision of feedback data 145 by receiver processing module 144 can be performed whenever a packet transmission failure occurs or based on an event trigger such as the determination that a change in feedback data has occurred that indicates a potential that a change in noise, interference or other transmission failure causes of the RF transceiver 125. For example, such a triggering event can be the generated by the number of packet transmission failures since the last triggering event or a time window or other time period exceeding a threshold. In another example, an long-term average packet error rate can be maintained and compared with a short-term average packet error rate. The deviation of these short and long term packet error rates by an amount greater than a threshold can be used to indicate a change in packet error rate and a potential change in the cause of packet transmission failure.

The feedback data 145 can be analyzed by the transmitter processing module 146 and the selection of one of a plurality of one of the plurality of transmission failure causes can be performed based on changes in feedback data. For instance, feedback data 145 can be analyzed to determine if a feedback data 145 indicates that one of the plurality of transmission failure causes has occurred that is different than the current transmission failure cause that has been selected. For instance, the transmitter processing module 146 can analyze feedback data 145 to determine transmission failure causes such as the presence of burst interference or other interference or a change in other noise parameters of the environment for a particular remote station or a plurality of remote stations. In addition, transmitter processing module 146 can analyze feedback data 145 to determine if one or more remote stations may be or are, multi-mode shared frequency devices that have switched modes to be inactive, indicating a new transmission failure cause for these remote stations.

In an embodiment of the present invention, transmitter processing module 146, based on feedback data 145 or other data, maintains a mode status for each remote station to indicate if that remote station is a multi-mode device and/or that indicates whether or not that particular remote station is in a mode that allows communication with RF transceiver 125. As indicated above, the mode status of a remote station can be determined based on a direct indication of the mode status received in communication from remote station itself. Also, mode status can be determined inferentially based on acknowledgements received from the remote station of successful packet transmissions or packet transmission failures for packets sent to the remote station. For instance, the mode status of a remote station can be switched from inactive to active communication mode if feedback data 145 indicates a packet transmitted to the remote station has been successfully acknowledged. Further, as will be discussed in greater detail in conjunction with FIG. 5, an analysis of a timing profile of packet transmission failures can indicate that a remote station that was an active communication mode has switched to an inactive mode.

RF transceiver 125 has a plurality of transmit parameters that govern the rate, power, protocol and protocol parameters used to transmit outbound data to one or more remote stations. Each transmit parameter has a corresponding default value. For instance, RF transceiver 125 may have a rate adjustment schedule, that controls the transmit rate of RF transceiver 125 based on a dynamic transmission adaptation algorithm, corresponding to a default case where packet transmission failures are attributed an AWGN environment. The transmit rate begins at the highest possible value and is decreased after a rate adjustment threshold of n packet transmission failures is met or exceeded. In the event that another one of the plurality of transmission failure causes is selected based on the feedback data 145, changes in the transmit parameters are made to correspond to the new transmission failure cause. For instance, data rates, rate adjustment thresholds, rate adjustment parameters and/or other aspects of a rate adjustment schedule can be modified, and/or retransmission delays, packet drop conditions, fragmentation or retransmission thresholds, or other transmission parameters can be modified to maximize the throughput, or otherwise to increase the efficiency of the RF transmitter 125 based on these new conditions.

For example, should the transmission failure cause indicate burst interference or a multi-mode remote station that has switched to an inactive mode, packet retransmissions to the effected station or stations can be delayed to allow queued transmission or retransmissions to other remote stations to be transmitted, increasing the transmission throughput and to allow the burst to end or the multimode station to switch modes again. Further, the rate adjustment schedule can be modified to increase the number of failed retransmissions required to decrease the transmit rate, and/or to require not only a certain number of failed retransmission attempts before the data rate is decreased, but also to require or to increase a required duration before the data rate is decreased. This duration can be calculated based on expected burst interference durations, measured burst error durations determined by monitoring the timing profile of packet transmission failures, expected time periods remote stations may be in an inactive mode that can be determined a priori, based on a switching schedule or other information provided by the remote station itself, or also based on monitoring the timing profile of packet transmission failures.

In this fashion, the transmit parameters of RF transceiver 125 can be more effectively adapted to current conditions of the environment and/or the conditions of the remote stations in communication with the RF transceiver at any given time.

Figure 5:
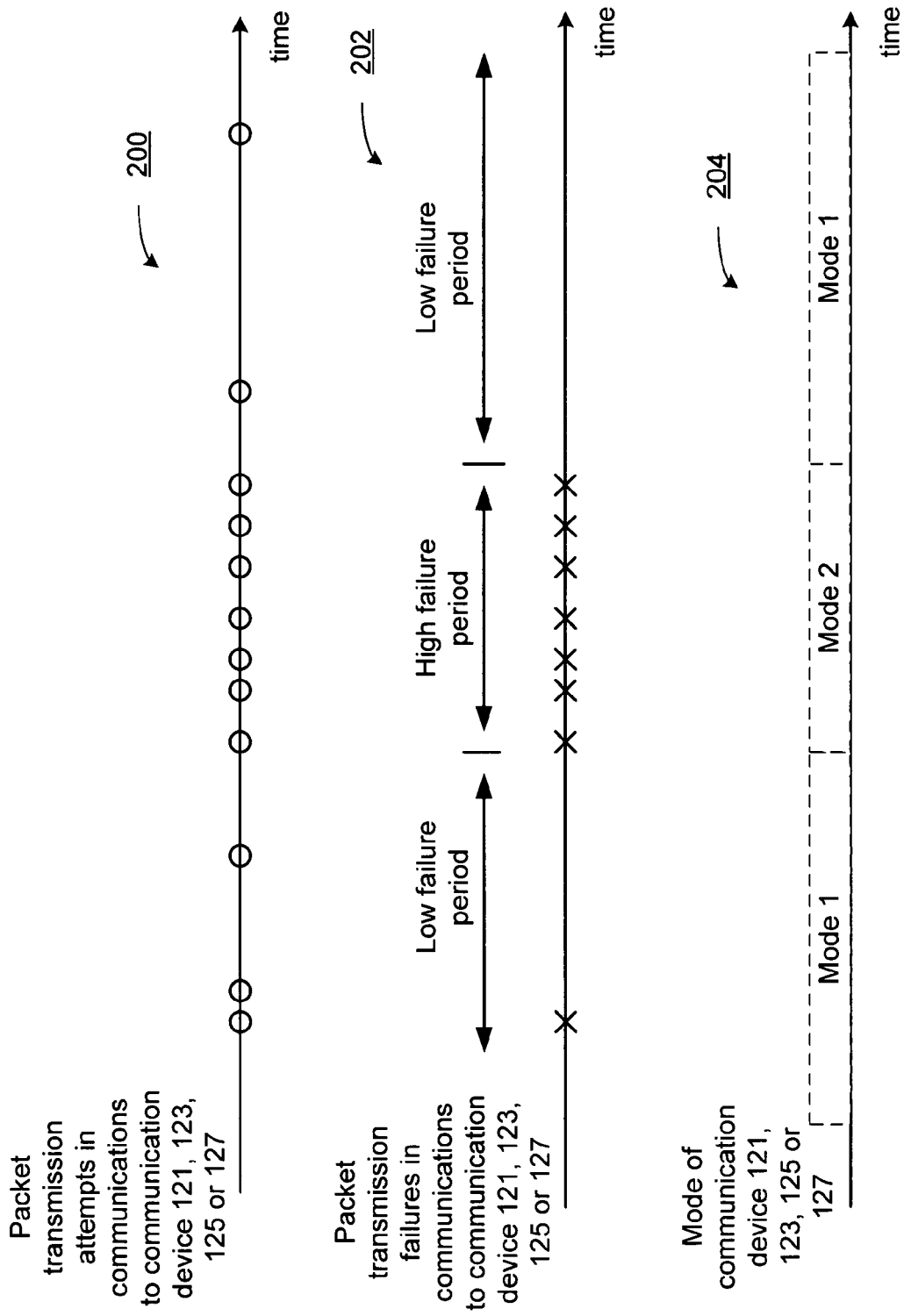
FIG. 5 is a time diagram in accordance with an embodiment of the present invention.

FIG. 5 is a time diagram in an embodiment of the present invention. In particular, in this embodiment, the features of the present invention that allow the selection of one of the plurality of failure causes and a corresponding adaptation of the transmit parameters are selectively disabled. A time profile is shown that indicates in graph 200 packet transmission attempts in communication by a communication device, such as access point 110, to another communication device, such as communication device 121, 123, 125 or 127 in a default condition where the cause of retransmission failures is assumed to be the standard AWGN case. It is noted that the time represented in this figure is not drawn to scale, but is rather presented to be illustrative of the concepts that aid in the understanding of certain aspects and embodiments of the present invention. In this example, communication device 121, 123, 125 or 127 is a multimode shared spectrum device that is active during the time periods indicated by mode 1 and is inactive during the time period indicated by mode 2. The circles on graph 200 represent packet transmission or retransmissions. Graph 202 indicates, by X's on the graph, the packet transmissions that failed over the same time period. As is shown, mode 1 times correspond to low failure periods where most or all packet transmission attempts do not result in packet transmission failures. The period of mode 2 corresponds to a high failure period since the communication device 121, 123, 125 or 127 is inactive with respect to communications with access point 110. Access point 110 continues to retransmit packets during the high failure period, even though communication device 121, 123, 125 or 127 is inactive. The rate adjustment schedule of access point 110 could potentially decrease the transmit data rate during this time, lowering the throughput of communications when communication device 121, 123, 125 or 127 switches back to active status in mode 1. Further, access point 110 wastes time and bandwidth trying to retransmit to communication device 121, 123, 125 or 127 during mode 2 that could be used by access point 110 to send packets to other remote stations.

FIG. 7 is a time diagram in accordance with an embodiment of the present invention In particular, in this embodiment, the features of the present invention that allow the selection of one of the plurality of failure causes and a corresponding adaptation of the transmit parameters are selectively enabled. A time profile is shown that indicates in graph 200' packet transmission attempts in communication by a communication device, such as access point 110, to another communication device, such as communication device 121, 123, 125 or 127 in a default condition where the cause of retransmission failures is assumed to be the standard AWGN case. It is noted that the time represented in this figure is not drawn to scale, but is rather presented to be illustrative of the concepts that aid in the understanding of certain aspects and embodiments of the present invention. In this example, communication device 121, 123, 125 or 127 is a multimode shared spectrum device that is active during the time periods indicated by mode 1 and is inactive during the time period indicated by mode 2. The circles on graph 200' represent packet transmission or retransmissions. Graph 202' indicates, by X's on the graph, the packet transmissions that failed over the same time period. As is shown, mode 1 times correspond to low failure periods where most or all packet transmission attempts do not result in packet transmission failures. During the period of mode 2 corresponds to a high failure period since the communication device 121, 123, 125 or 127 is inactive with respect to communications with access point 110.

Figure 6:
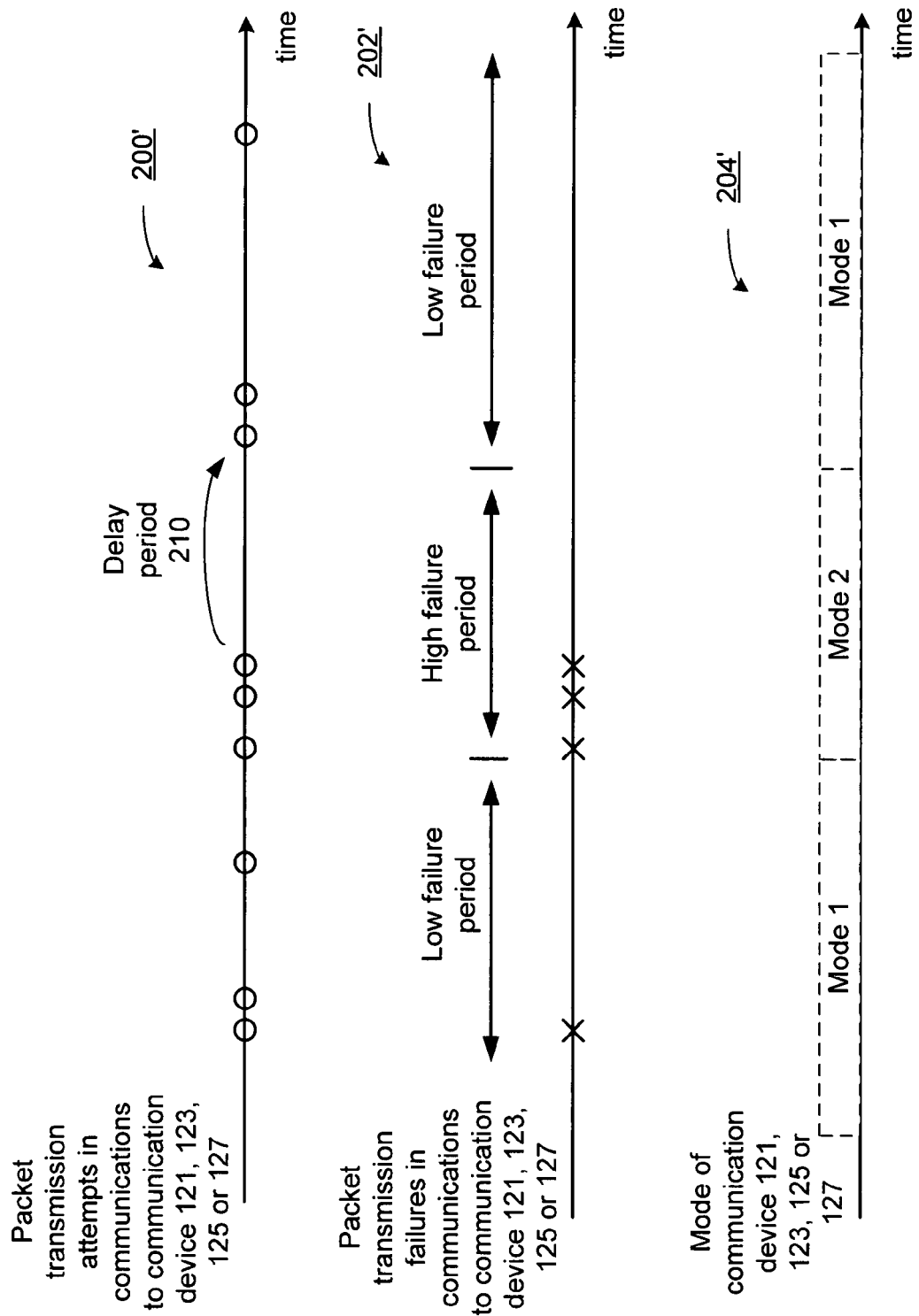
FIG. 6 is a time diagram in accordance with an embodiment of the present invention.

Unlike the case shown in FIG. 6, Access point 110 has noted, based on information transmitted by communication device 121, 123, 125 or 127, that this remote station is capable of multi-mode communication. Communication device monitors the timing profile and analyzes feedback data based on packet transmission failures during the high failure period to determine that a new cause of transmission failure, the switch of communication device 121, 123, 125 or 127 to mode 2 has occurred. In response, access point 110 delays the retransmission of packets to communication device 121, 123, 125 or 127 by a delay period 210 and modifies the rate adjustment schedule to require not only m retransmissions, but the expiration of a time period T, as conditions to decrease the data rate for transmissions to communication device 121, 123, 125 or 127. During this delay period 210, communication device sends packets to other remote stations. After the delay period 210, communication station 45 retransmits a packet that is acknowledged by communication device 121, 123, 125 or 127. Access point 110 then continues to transmit to communication device 121, 123, 125 or 127 without a decrease in transmit data rate. Indication of the acknowledgement in feedback data 145 allows communication device to determine that communication device 121, 123, 125 or 127 has reentered active status and in response the cause of packet retransmission failure is returned to the default position of AGWN with corresponding modification to the transmit parameters. This can occur upon the receipt of the acknowledgement or held until the next packet transmission failure.

While the examples presented in conjunction with FIGS. 5 and 6 present several alternative features of the present invention, a wider range of alternatives and embodiments are likewise possible as have been also discussed.

FIG. 7 is a flowchart representation of a method in accordance with an embodiment of the present invention. In particular a method is presented for use with one or more features or functions presented in conjunction with FIGS. 1-6, such as method for use in an radio frequency (RF) transceiver coupled to transmit an outbound RF signal in accordance with a plurality of transmit parameters to at least one remote station and receive a inbound RF signal from the at least one remote station. In step 400, a packet transmission failure is detected. In step 410, one of a plurality of transmission failure causes is selected. In step 420, at least one of a plurality of transmit parameters is adjusted, based on the selected one of the plurality of transmission failure causes.

In an embodiment of the present invention, step 410 includes analyzing feedback data generated by the RF transceiver based on the inbound RF signal. Analyzing feedback data can include monitoring a timing profile of a plurality of transmission failures. The feedback data can include failure statistics. The remote station includes a multi-mode shared frequency transceiver that can operate in a first mode for communication with the RF transceiver and a second mode that precludes communication with the RF transceiver. Step 420 can include determining the multi-mode shared frequency status of the remote station and whether the remote station is operating in a first or second mode of operation.

In an embodiment of the present invention, step 420 can include increasing a retransmission delay for retransmissions to the remote station, adjusting a rate adjustment parameter. The plurality of transmit parameters can includes a first rate adjustment schedule parameter that modifies a rate adjustment schedule that controls a transmit rate of the RF transceiver. The first rate adjustment schedule parameter can correspond to a number of failed retransmissions required to decrease the transmit rate. The plurality of transmit parameters can include a second rate adjustment schedule parameter that modifies the rate adjustment schedule that controls the transmit rate of the RF transceiver. The second rate adjustment schedule parameter can correspond to a duration of failed retransmissions required to decrease the transmit rate.

FIG. 8 is a flowchart representation of a method in accordance with an embodiment of the present invention. In particular, a method is presented that includes several steps described in conjunction with FIG. 7 that are referred to by common reference numerals. In addition, step 390 of transmitting, from the remote station, a data packet to the RF transceiver that indicates a multi-mode shared frequency status.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A circuit comprising:
    a transceiver coupled to transmit an outbound signal via a first network protocol and in accordance with a plurality of transmit parameters, to at least one remote station and receive an inbound signal from the at least one remote station, the transceiver operable to detect a packet transmission failure, to select one of a plurality of transmission failure causes, and to adjust at least on of a plurality of transmit parameters, based on the selected one of the plurality of transmission failure causes;
    wherein selection of one of the plurality of transmission failure causes is based on determining that the at least one remote station is a multi-mode shared frequency device communicating via a second network protocol, wherein the first network protocol and the second network protocol are each different ones of: a piconet protocol and a wireless local area network protocol;
    wherein the selection of one of the plurality of transmission failure causes includes analyzing feedback data generated by the transceiver based on the inbound signal;
    wherein the inbound signal includes a mode status that indicates the at least one remote station is a multi-mode shared frequency device;
    wherein the at least one of the plurality of transmit parameters includes a first rate adjustment schedule parameter that modifies a rate adjustment schedule that controls a transmit rate of the transceiver;
    wherein the first rate adjustment schedule parameter corresponding to a number of failed retransmissions required to decrease the transmit rate.

2. The circuit of claim 1 wherein analyzing feedback data includes monitoring a timing profile of a plurality of transmission failures.

3. The circuit of claim 1 wherein analyzing the feedback data includes analyzing failure statistics.

4. The circuit of claim 1 wherein the remote station includes a multi-mode shared frequency transceiver that can operate in a first mode for communication with the transceiver and a second mode that precludes communication with the transceiver.

5. The circuit of claim 4 wherein the remote station transmits a data packet to the transceiver that indicates a multi-mode shared frequency status.

6. The circuit of claim 4 wherein the selection of one of the plurality of transmission failure causes includes determining that the remote station is operating in the second mode.

7. The circuit of claim 1 wherein the adjustment of the at least one of the plurality of transmit parameters includes increasing a retransmission delay for retransmissions to the remote station.

8. The circuit of claim 1 wherein the adjustment of the at least one of the plurality of transmit parameters includes adjusting a rate adjustment parameter.

9. The circuit of claim 1 wherein the at least one of the plurality of transmit parameters includes a second rate adjustment schedule parameter that modifies the rate adjustment schedule that controls the transmit rate of the transceiver.

10. The circuit of claim 9 wherein the second rate adjustment schedule parameter corresponds to a duration of failed retransmissions required to decrease the transmit rate.

11. A method for use in a transceiver coupled to transmit an outbound signal in accordance with a plurality of transmit parameters to at least one remote station and receive an inbound signal from the at least one remote station, the method comprising:
    detecting a packet transmission failure;
    determining that the at least one remote station is a multi-mode shared frequency device for operation selectively in a first mode for communication with the transceiver and in a second mode that precludes communication with the transceiver, wherein the first mode and the second mode are each different ones of: a piconet protocol and a wireless local area network mode that includes communication via a wireless local area network protocol;

selecting one of a plurality of transmission failure causes, based on a determination that the at least one remote station is operating in the second mode;

adjusting at least one of a plurality of transmit parameters, based on the selected one of the plurality of transmission failure causes;

wherein the step of selecting of one of the plurality of transmission failure causes includes analyzing feedback data generated by the transceiver based on the inbound signal;

wherein the inbound signal includes a mode status that indicates the at least one remote station is a multi-mode shared frequency device;

wherein the at least one of the plurality of transmit parameters includes a first rate adjustment schedule parameter that modifies a rate adjustment schedule that controls a transmit rate of the transceiver;

wherein the first rate adjustment schedule parameter corresponding to a number of failed retransmissions required to decrease the transmit rate.

12. The method of claim 11 wherein analyzing feedback data includes monitoring a timing profile of a plurality of transmission failures.

13. The method of claim 11 wherein analyzing the feedback data includes analyzing failure statistics.

14. The method of claim 11 further comprising the step of: transmitting, from the remote station, a data packet to the transceiver that indicates a multi-mode shared frequency status.

15. The method of claim 11 wherein the step of selecting one of the plurality of transmission failure causes includes determining that the remote station is operating in the second mode.

16. The method of claim 11 wherein the step of adjusting the at least one of the plurality of transmit parameters includes increasing a retransmission delay for retransmissions to the remote station.

17. The method of claim 11 wherein the step of adjusting the at least one of the plurality of transmit parameters includes adjusting a rate adjustment parameter.

18. The method of claim 11 wherein the at least one of the plurality of transmit parameters includes a second rate adjustment schedule parameter that modifies the rate adjustment schedule that controls the transmit rate of the transceiver.

19. The method of claim 18 wherein the second rate adjustment schedule parameter corresponds to a duration of failed retransmissions required to decrease the transmit rate.

* * * * *

UNITED STATES PATENT AND TRADEMARK OFFICE
CERTIFICATE OF CORRECTION

PATENT NO. : 8,130,659 B2
APPLICATION NO. : 11/731239
DATED : March 6, 2012
INVENTOR(S) : Mark Gonikberg It is certified that error appears in the above-identified patent and that said Letters Patent is hereby corrected as shown below:

In the Claims:

Col. 14, line 1, in claim 1: after "at least" replace "on" with --one--

Signed and Sealed this
First Day of October, 2013

Teresa Stanek Rea
*Deputy Director of the United States Patent and Trademark Office*